United States Patent [19]
Bundy et al.

[11] Patent Number: 5,736,049
[45] Date of Patent: Apr. 7, 1998

[54] METHOD AND MEANS FOR ODOR CONTROL IN WASTE WATER LAGOONS

[75] Inventors: Dwaine S. Bundy, Ames, Iowa; Ken Bokor, Blenhein, Canada; Edward G. Andrews, Sioux City, Iowa

[73] Assignee: Iowa State University Research Foundation, Inc., Ames, Iowa

[21] Appl. No.: 796,424

[22] Filed: Feb. 6, 1997

[*] Notice: Related U.S. Application Data

[60] Provisional application No. 60/024,364 Jun. 25, 1996.

[51] Int. Cl.$^6$ .................................................. C02F 11/06
[52] U.S. Cl. ..................... 210/620; 210/747; 210/758; 210/170; 210/199; 210/241
[58] Field of Search ................................. 210/609, 620, 210/747, 758, 170, 199, 241

[56] References Cited

PUBLICATIONS

APHA. 1992. Standard Methods For the Examination of Water and Wastewater. 18th Edition. American Public Health Association. Washington D.C.

Barth, C.L. and Polkowski, L.B., 1971. Low-volume, surface-layer aeration-conditioned manure storage. In: Livestock Waste Management and Pollution, Proceedings of International Symposium on Livestock Wastes. ASAE, 2950 Niles Rd., St. Joseph, MI 49085-9659. p. 279-282.

Barth, C.L. Hill, D.T. and Polkowski, L.B. 1974. Correlating ordor intensity index and odorous components in stored dairy manure. Transactions of the ASAE. 17(4) ; 741-744, 747.

Bundy, D.S., Liu, Q. and Hoff, S.J. 1993. An olfactometer for livestock odor measurement. Paper presented at the ASAE International Witner Meeting. ASAE Paper No. 934522.

Ginnivan, M.J. 1983. Shallow aeration of piggery waste treatment lagoons. II. Odor control. Argriculture, Ecosystems and Environment. 10:31-36.

Liu, Q., Bundy, D.S. and Hoff. S.J. 1993. Utilizing ammonia concentrations as an odor threshould indicator for swine facilties. In: Proceedings of Fourth International Symposium of Livestock Environment. ASEA, 2950 Niles Rd., St. Joseph, MI 49085-9659. p.678-685.

Schulz, T.J. and Barnes, D. 1990. The stratified facultative lagoon for the treatment and storage of high strength agricultural wastewaters. *Agricultural Wastes*. 10:15-36.

Zhang, R.H., Lorimore, J. and Melvin, S.W. 1995. Design and management of anaerobic lagoons in Iowa for animal manure storage and treatment. Iowa State University Extension publication Pm-1590.

*Primary Examiner*—Thomas G. Wyse
*Attorney, Agent, or Firm*—Zarley, McKee, Thomte, Voorhees, & Sease

[57] ABSTRACT

A method for controlling odor in a waste water lagoon comprises the steps of aerating a top horizontal layer of a lagoon adjacent its upper surface at a depth of approximately 12 to 24 inches by introducing air through a plurality of nozzles submerged in the layer to create a plurality of air bubbles in the layer. The nozzles are moved horizontally through the layer. A device for controlling the odor in waste water lagoons includes a support structure with an elongated boom operatively secured to the support structure and extending outwardly therefrom to operatively contact water in an adjacent lagoon. Compressed air is delivered through a plurality of downwardly extending nozzles on the boom into a layer of water on the top of the lagoon approximately 12 to 24 inches deep. Power elements are secured to the boom to cause the boom to move horizontally with respect to the lagoon while the compressed air is being delivered through the nozzles.

24 Claims, 6 Drawing Sheets

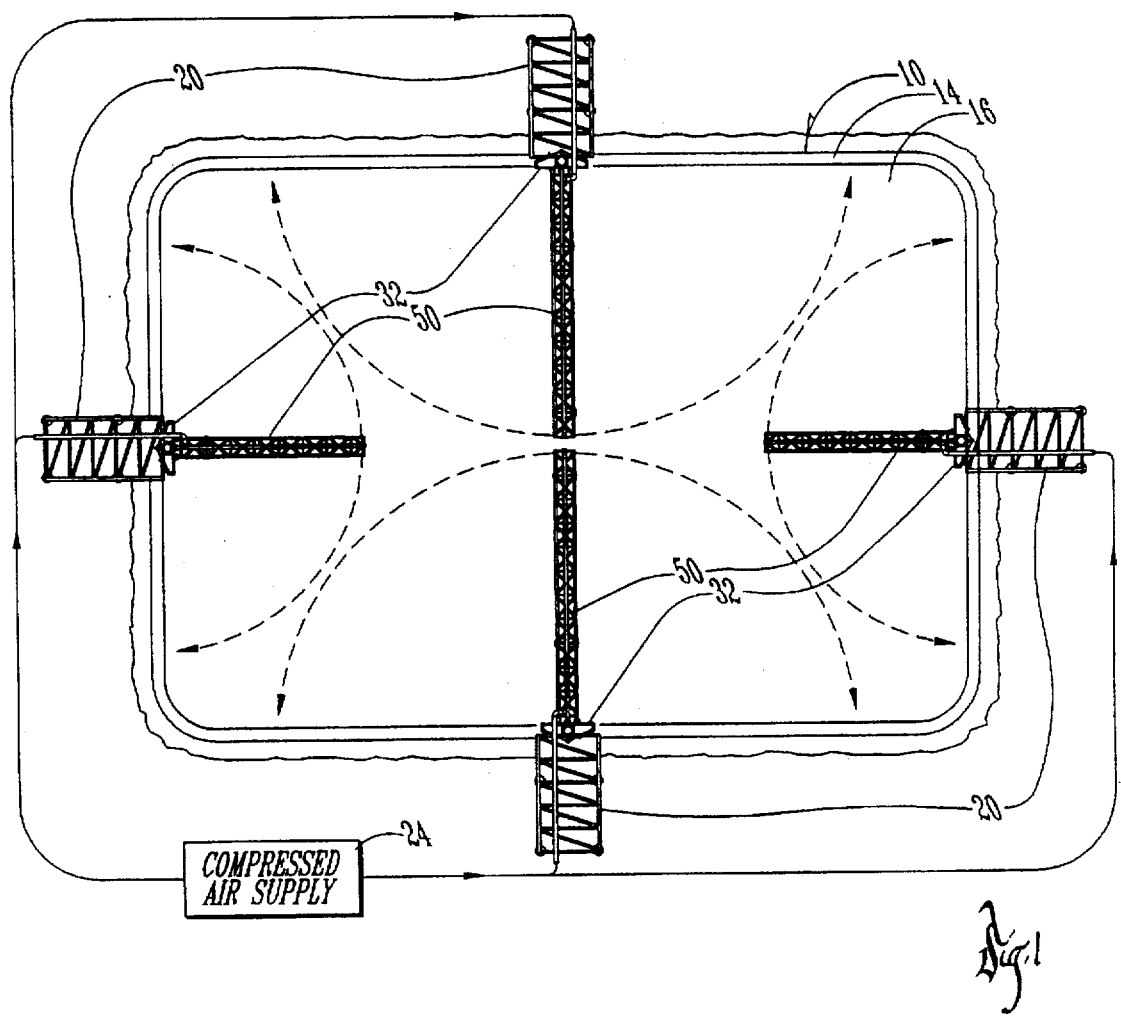

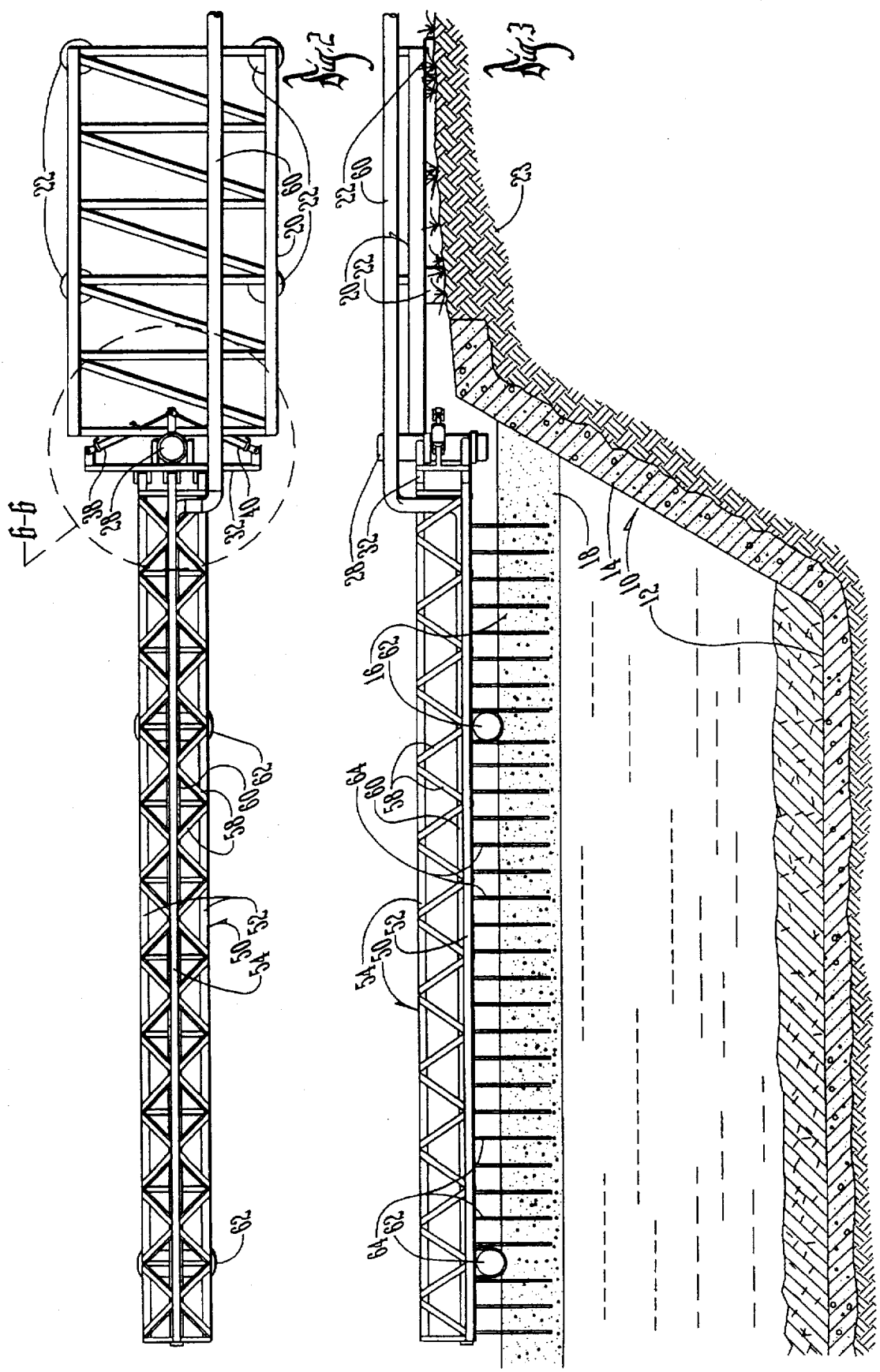

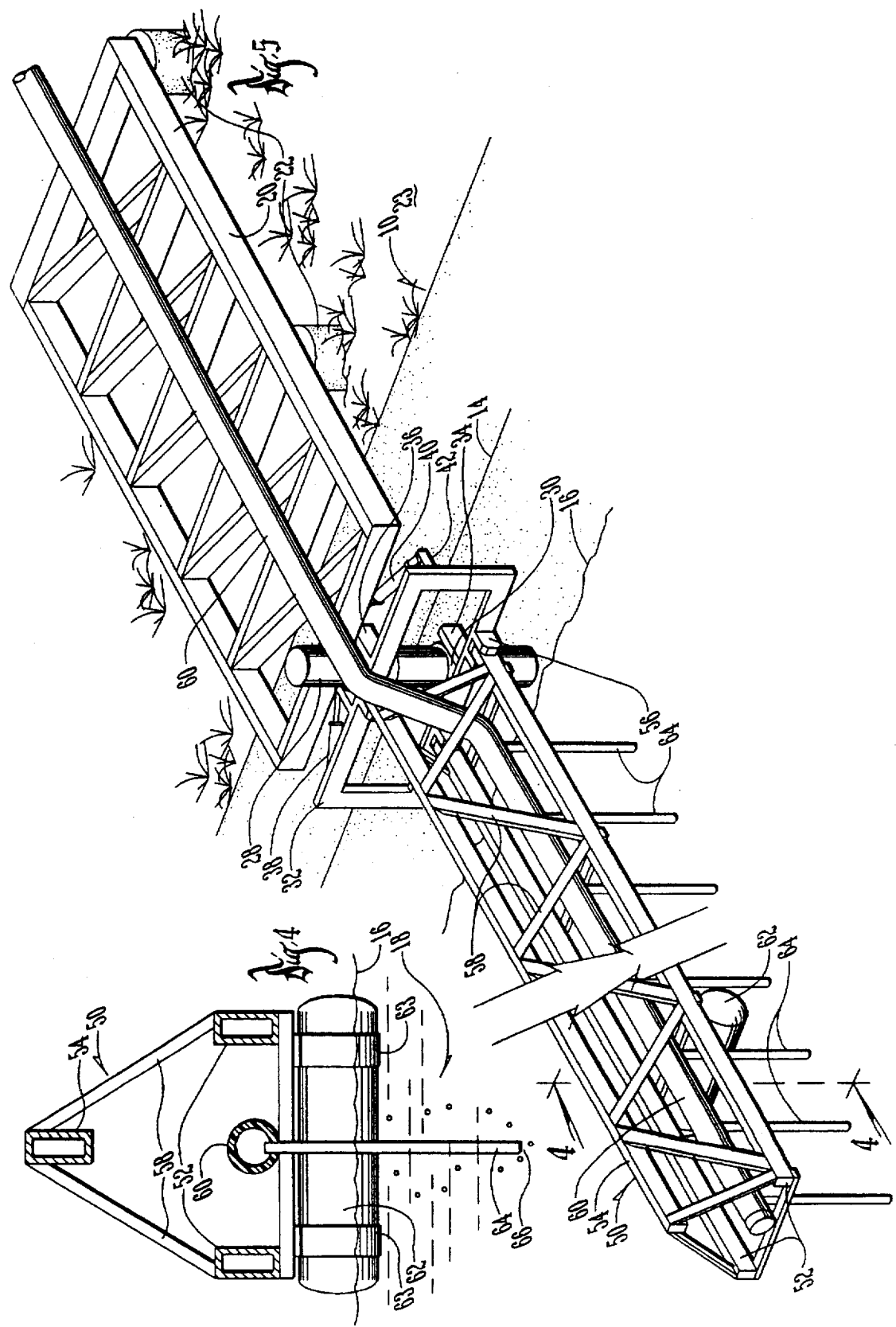

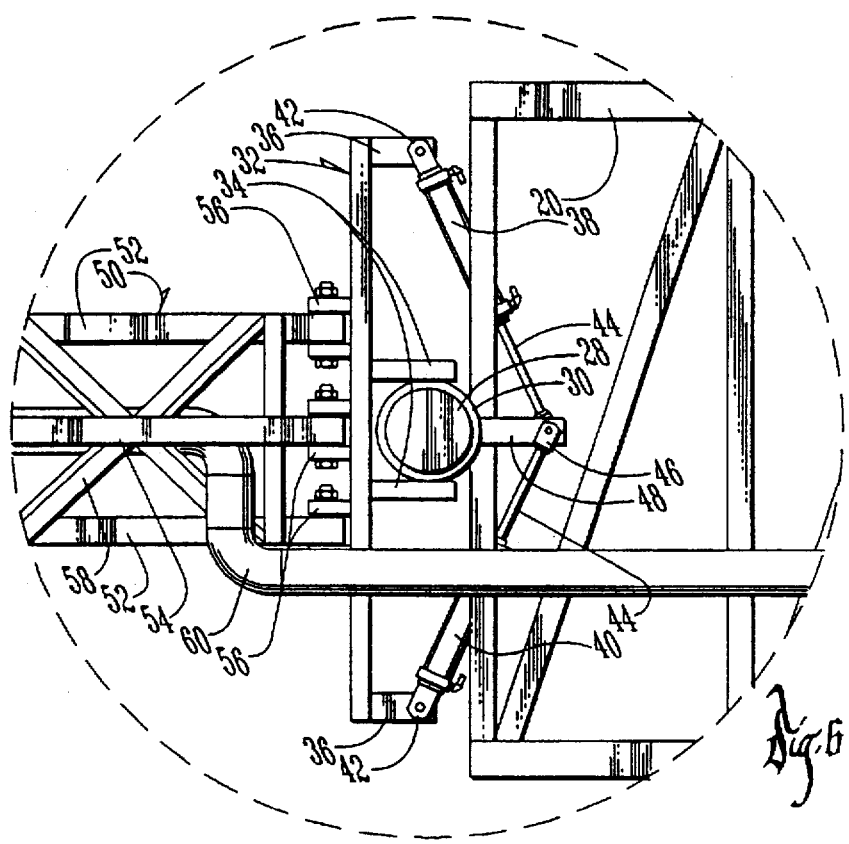

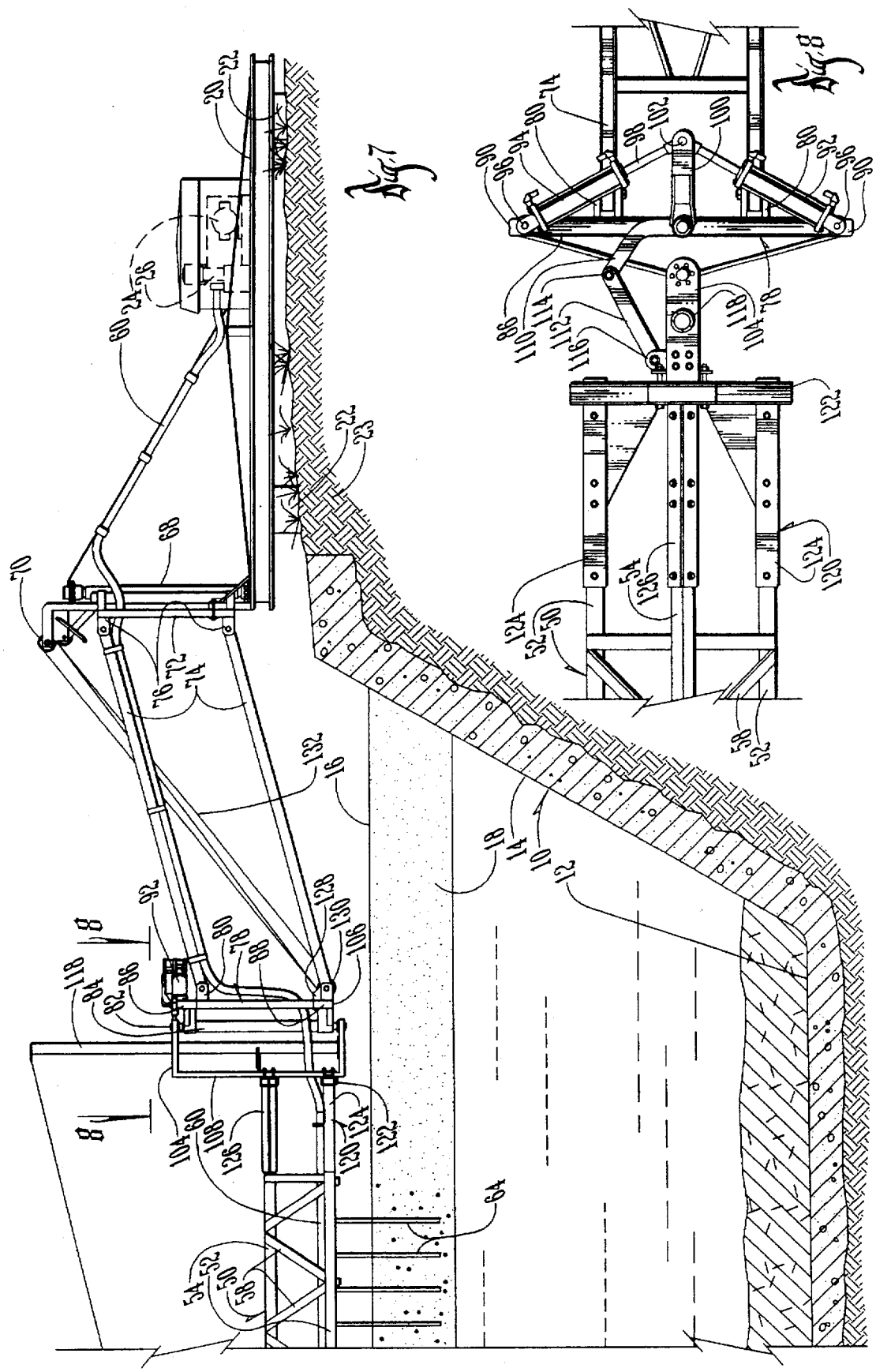

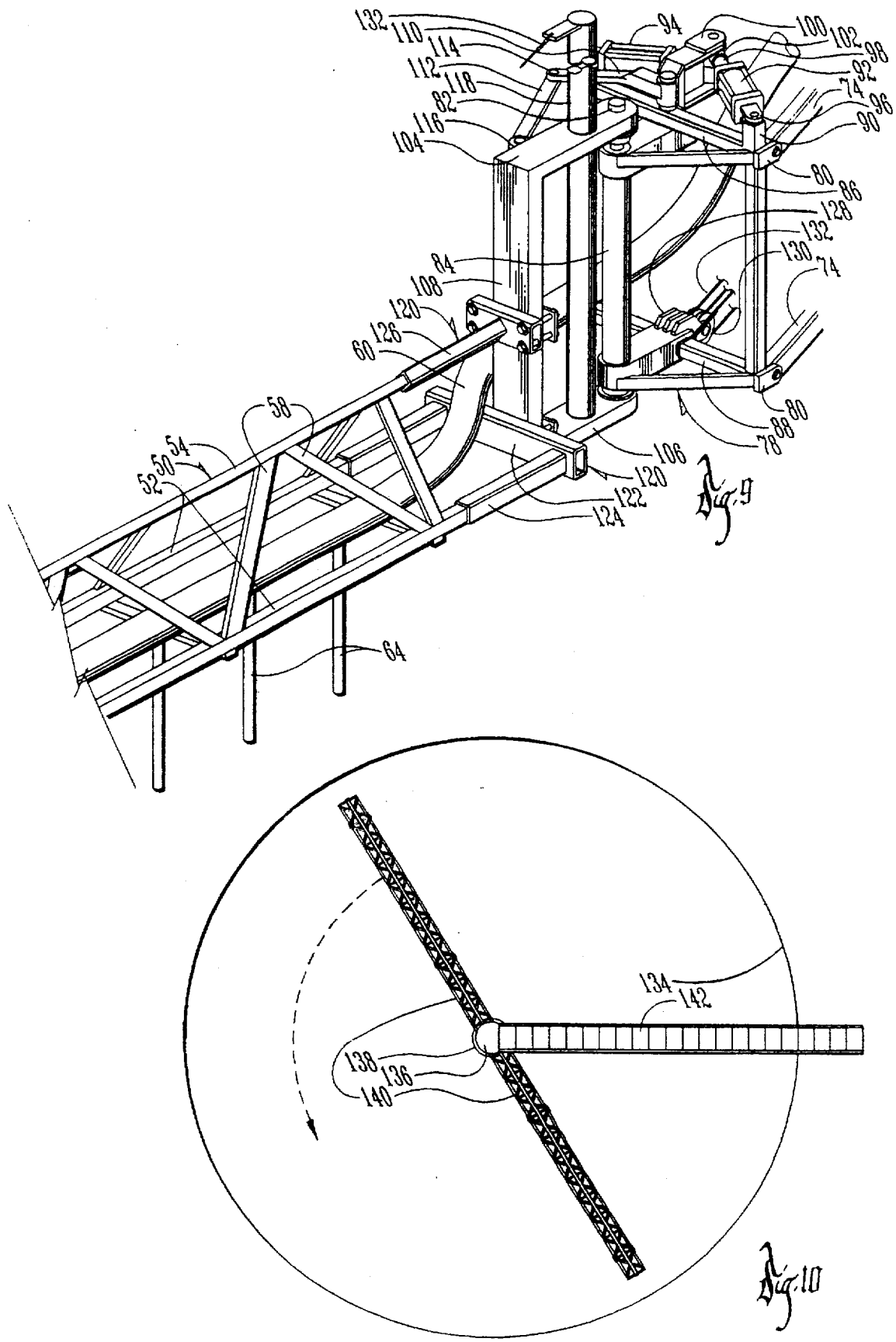

METHOD AND MEANS FOR ODOR CONTROL IN WASTE WATER LAGOONS

This application is based upon the applicant's provisional application Ser. No. 60/024,364 filed Jun. 25, 1996.

BACKGROUND OF THE INVENTION

Odors generated from livestock production facilities are the most important air quality concern in the rural United States. Odor control with proper animal waste management has become the top environmental priority for livestock producers. In recent years, several odor nuisance lawsuits have been brought by neighboring residents or the public against swine producers with odorous manure storage facilities.

Odors are produced during microbial decomposition of animal manure under septic conditions. Odors found above a manure storage facility (such as a storage tank, earthen basin, or lagoon) are a mixture of noxious gases (hydrogen sulfide and ammonia) and malodorous volatile organic compounds (volatile fatty acids, aldehydes, alcohols, easters, amines, sulfides, mecaptans, indole, skatol, etc).

Many livestock producers are over designing their manure storage facilities in an effort to reduce the amount of noticeable odors that are produced. This can be an expensive approach to manage odors, and it is not always effective.

Aeration is an established method for treating municipal and agricultural waste that will break down organic material without producing odorous compounds. Aeration systems that have been utilized for odor control have required that large amounts of compressed air be placed throughout the lagoon so that the entire body of liquid is aerated. However, this requires a large amount of energy which is economically impractical to treat livestock wastes that contain high concentrations of organic master.

SUMMARY OF THE INVENTION

A method has been developed to progressively aerate just the top layer of the liquid in the waste water. In this process, a surface layer of the waste water in the storage facility is aerated with compressed air to a depth of 2 feet or less which creates an aerobic environment on the top of the storage facility. This aerobic layer acts as a blanket over the odors produced from the manure below. In such a blanket, aerobic bacteria convert odorous gases and compounds into odor free-gases and compounds before they escape into the air.

Laboratory studies have shown that this surface aeration system requires only about 10% of the energy that is required compared to a total aeration system to control the odor from the surface of the waste water.

This invention involves a traveling bar or boom system which is secured to the shore of the lagoon or basin or the sides or center of a holding tank. The precise location and size of the rotation bars depends on the size of the storage facility.

The length and degree of rotation of the booms are determined by the dimensions of the storage facility. The boom floats above the surface of the storage facility on floats, and the boom is attached to a pivot mount which is secured on the shore of the lagoon or basin or to the side of a storage tank. This pivot mount allows the boom to rotate back and forth, and the mount allows the arm to move up and down on the surface as the amount of liquid in the storage facilities rises and falls. Compressed air, which is generated by an on-shore air blower, is fed to the surface aerator by means of a hose that is connected to the center of the aerator. The air is then fed into the aeration boom which in turn is fed into the waste water through nozzles. These nozzles are placed at various distances and depths so as to produce the most efficient aeration of the waste water. The air bubble size is controlled by the orifice in the nozzle.

To meet oval, circular, and uniquely shaped manure treatment systems, a circular system can be utilized. This system is characterized by surface aerator that floats on the lagoon and has one or more rotating aeration booms which can cover 360 degrees. The rotation aeration booms can be suspended beneath the surface of the liquid at a predetermined depth of up to two feet. The rotating booms have air nozzles attached to it which inject the compressed air into the liquid.

The booms are rotated by suitable power means mounted in the center of the support trusses which float on the surface of the liquid. The aeration boom while being driven down the center, is suspended down its length by floatation devices. The aeration boom can be adjusted to aerate at a variety of depths.

The compressed air is generated, by a suitable air blower which is located on the shore. The compressed air is fed to the surface aerator by means of a hose that runs to the center of the aerator. The air is then fed into the aeration boom which in turn is fed into the liquid through the nozzles. These nozzles are placed at various distances and depths so as to produce the most efficient aeration of the waste water. These nozzles are 3 mm in diameter or smaller.

To further conserve energy, the system can be operated intermittently. Testing has shown that odors can be effectively controlled over the entire day by operating the system on an on/off cycle—for example, operating the system for 12 hours, and then shutting down the system for 12 hours. In locations where the electric utility company offers lower rates to farmers in the evening, intermittent operation can offer very significant cost savings.

The following are the unique features of the surface aeration system that has been developed:

1. Designed to control odors without treating the entire waste volume.
2. Can control the depth of the aerobic zone.
3. Creates an aerobic zone by using high volume, low pressure air, thus lowering the horsepower requirements of the system.
4. Designed to distribute the lowest amount of air to maintain the aerobic zone, and the aerobic zone can be distributed over the entire surface.
5. Able to follow the water level through floatation devices or height adjustments.
6. Speed of the aeration boom can be adjusted to control odor.
7. Traveling boom unit can easily be removed from the system for servicing and winterization.
8. System is designed to fit on new or existing storage facility.
9. System is designed for ease of installation with no on-site fabrication.
10. System is designed with nozzle spacing so that air is distributed evenly over the length of the aeration boom based upon the speed of the boom.
11. Blower sizing and nozzle sizing can be adjusted to supply air to a wide range of BOD requirements.
12. Aeration boom acts as a distribution manifold to deliver the air to the nozzles or membrane.
13. Traveling boom unit may be driven by hydraulic cylinders that propel the aeration boom from side to side.

14. Traveling boom unit is anchored to the burm of storage lagoon or earthen basin using cement posts or drive steel spiels.
15. Truss system controls the integrity of the structure.
16. Units can be controlled so as to be utilized in an intermittent operation to save energy cost while maintaining an aerobic zone to control the odors.
17. The structure of the unit can be made with a variety of materials, such as steel, stainless steel, aluminum, plastic, or a combination of two or more of these materials.
18. In an anaerobic manure facility, it creates an aerobic zone on the surface (up to 2 feet deep) without disturbing the anaerobic activity in the lower level of the lagoon.
19. The system can be used on a variety of livestock waste storage facilities.

BRIEF DESCRIPTION OF THE DRAWINGS

FIG. 1 is a plan view of a waste water lagoon or container substantially rectangular in shape which is being serviced by a plurality of devices of this invention;

FIG. 2 is an enlarged scale plan view of an aerating boom structure of this invention;

FIG. 3 is a partial sectional view through a waste water lagoon utilizing the boom structure of FIG. 2;

FIG. 4 is an enlarged scale sectional view taken on line 4—4 of FIG. 5;

FIG. 5 is a partial perspective view of the device shown in FIG. 3;

FIG. 6 is an enlarged scale plan view showing the structure at line 6—6 of FIG. 2;

FIG. 7 is a side elevational view of an alternate form of the invention;

FIG. 8 is an enlarged scale plan view taken on line 8—8 of FIG. 7;

FIG. 9 is a perspective view of the structure of FIG. 8; and

FIG. 10 is a plan view of a second alternative embodiment of this invention.

DESCRIPTION OF THE PREFERRED EMBODIMENT

The term "lagoon" as used herein will designate earthen structures, as well as all water holding basins made of concrete, steel or the like which are commonly used to hold waste water.

With reference to FIGS. 1 through 6, and particularly to FIG. 3, lagoon 10 has a bottom 12 with tapered sidewalls 14, an upper surface 16, and an upper layer 18 immediately below the upper surface and having a vertical depth in the order of 12 to 24 inches. It is the upper layer 18 that is aerated as will be discussed hereafter.

With reference to FIGS. 2 and 5, a support platform 20 is mounted on concrete posts 22 which are embedded in the bank 23 which typically surrounds an earth basin lagoon. Not shown in FIGS. 1 through 6, but typically shown in FIG. 7, are air pump 24 and hydraulic pump 26 mounted on platform 20. With reference to FIG. 6, a vertical column 28 is mounted on the end of platform 20 adjacent the lagoon. A vertical sleeve 30 having an inside diameter substantially equal to the outer diameter of column 28 is rotatably mounted on column 28. A rectangular frame 32 has a pair of spaced vertical bars 34 which extend along the vertical sides of sleeve 30 and are rigidly secured thereto. Thus, when sleeve 30 rotates with respect to column 28, frame 32 will rotate with the sleeve. A pair of brackets 36 extend outwardly from the upper corners of frame 32. A pair of cylinders 38 and 40 having clevice and pin assemblies 42 on one end thereof are pivotally secured to the brackets 36. Piston rods 44 extend outwardly from the other end of cylinders 38 and 40 and, by means of clevice and pin assemblies 46, are pivotally secured to the outward end of the rearwardly extending arm 48 which is welded or otherwise secured to sleeve 30.

An elongated horizontal boom 50 is comprised of two parallel spaced lower members 52 and an upper elongated member 54 which is parallel to the members 52. (See FIGS. 4 and 5). A plurality of diagonally extending struts 58 interconnect the elongated members 52 and 54. A flexible air tube 60 extends from air pump 24 (e.g., see FIG. 7) and extends through the center of boom 50. Suitable floats 62 are secured by brackets 63 (FIG. 4) to maintain boom 50 in a horizontal position on the upper surface 16 of the lagoon water. A plurality of air nozzle tubes 64 (FIG. 4) extend downwardly from tube 60 and are of sufficient length that the lower orifice end 66 thereof penetrates into the lagoon water a distance of between 12 and 24 inches. The vertical depth of the upper layer 18 is normally also in the order of 12 to 24 inches. The spacing of the nozzles can be progressively smaller outwardly of platform 2D.

With reference to the first alternative embodiment of the invention as shown in FIGS. 7–9, and with particular reference to FIGS. 7 and 9, a vertical post 68 is mounted on the end of platform 20 adjacent the lagoon 10. A conventional winch 70 is mounted on top of post 68. A rectangular frame 72 is additionally mounted on the outward end of the platform 20 adjacent post 68. Four elongated arms 74 are pivotally connected to frame 72 by pivotal connections 76. A rectangular frame 78 is pivotally mounted to the other ends of elongated arms 74 by pivotal connections 80.

With reference to FIG. 9, a vertical post 82 is rigidly secured to the center of frame 78 and has a vertical sleeve 84 rotatably mounted thereon. Frame 78 has a horizontal upper bar 86 extending across the upper portion thereof, and a horizontal bar 88 extending along the lower portion thereof. Brackets 90 are secured to the upper ends of upper bar 86, and cylinders 92 and 94 are pivotally secured to the opposite ends of bar 86 by clevice and pin assemblies 96. Conventional piston rods 98 extend from the other ends of cylinders 92 and 94 opposite to clevice and pin assemblies 96, and are pivotally connected to a rearwardly extending arm 100 by means of clevice and pin assembly 102. Arm 100 as shown in FIGS. 8 and 9 is rigidly secured to the upper end of sleeve 84.

A horizontal upper arm 104 is rigidly secured by one of its ends to sleeve 84. Similarly, a horizontal arm 106 is rigidly secured by one of its ends to the lower end of sleeve 84. A vertical member 108 extends between the free ends of horizontal arms 104 and 106 as best shown in FIG. 9. One end of the link 110 is rigidly secured to sleeve 84 at the top thereof and has its other end pivotally secured to link 112 by pivot 114. The other end of link 112 is pivotally secured by pivot 116 to the upper portion of horizontal arm 104. A vertical post 118 is rigidly secured to the arms 104 and 106 and extends upwardly therefrom.

As shown in FIG. 9, a horizontally disposed U-shaped bracket 120 is rigidly secured to the lower end of vertical member 108 and is comprised of a horizontal cross-bar 122 with two outwardly extending arms 124. Similarly, an upper arm 126 has one of its ends rigidly secured to member 108 at a distance above the arms 124. The arms 124 and 126 are adapted to receive the lower members 52 and upper member 54, respectively of boom 50.

With reference to FIG. 9, a bracket 128 is rigidly secured to horizontal bar 88 such as by welding or the like, and a winch cable 130 is secured thereto in any convenient manner and extends upwardly to winch 70. The arms 74 can be raised or lowered with respect to platform 20 by shortening or lengthening the cable 130 between bracket 128 and winch 70. This has the effect of raising or lowering boom 50 to accommodate different water levels in the lagoon 10.

With reference to FIG. 10, a circular tank 134 comprises a different form of lagoon. The tank 134 has a center support pivot 136 with a sleeve 138 rotatably and slidably mounted thereon. A suitable gear motor (not shown) or the like on post 136 can be used to rotate the sleeve 138. Boom members 140 are rigidly secured to sleeve 138 and extend outwardly therefrom in opposite directions. Booms 140 are of the same general construction as the boom 50. The booms 140 will be equipped with air nozzle tubes 64 and floats 62 and will function in regard to the waste water in tank 134 in the same manner that boom 50 operates in regard to lagoon 10. The floats on booms 140 will cause the booms to rise and fall with the level of liquid in the tank 134. An appropriate winch mechanism (not shown) can also be utilized to adjust the height of booms 140 if desired.

In regard to the device of FIGS. 1 through 6, the boom 50 can be pivoted at least 180° by simultaneously withdrawing and extending the piston rods 42 of cylinders 38 and 42 (FIG. 6) which are hydraulically secured to the hydraulic pump 26 mounted on platform 20. This action exerts pivotal force on frame 32 which causes sleeve 30 to rotate on post 28. That rotational motion of frame 32 causes boom 50 to move in the direction of the arrows shown in FIG. 1. Air is introduced into the nozzle tube 64 at a pressure of between 2–5 psi. The air bubbles permeate the upper layer 18 and aerate the same. As previously described, this aerated layer inhibits the emission of odors from the liquid below the upper layer and hence tends to seal the lagoon 10 against the escape of unwanted odors. Suitable controls (not shown) can be used to vary the speed of rotation of the booms 50 as well as the pressure of the air being emitted from the orifices 66.

It should be noted that the spacing of the tubes 64 can be varied from end of boom 50 to the other with the spacing between the tubes being greater adjacent the edge of the lagoon and becoming closer together towards the opposite end of the boom. Because the tubes at the inner end of boom 50 have to travel a greater distance as the boom pivots, the above described variable spacing of the tubes tends to equalize the amount of air being introduced in the layer 18 along the length of the boom.

As described above, the booms can be reciprocally pivoted for a period of twelve hours or so, and then can remain dormant for the next twelve hours or so wherein the foregoing process is repeated.

The principal difference between the embodiment in FIGS. 1 through 6 and the embodiment in FIGS. 7 through 9 is that the latter structure is able to have the boom 50 raised or lowered with respect to the elevation of the upper surface 16 of the lagoon. This change in elevation is effected by winch 60 operating through winch cable 130 in the manner described heretofore. The operation of the pivotal action on the boom 50 of this second embodiment is essentially the same as that for FIGS. 1 through 6. With reference to FIG. 9, the actuation of cylinders 92 and 94 is essentially the same as the actuation of cylinders 38 and 40 as described heretofore. The operation of cylinders 92 and 94 causes arm 100 to in turn cause sleeve 84 to pivot. This causes the arms 104 and 106 to also pivot along with vertical arm 108. The arms 124 and 126 will also pivot and will cause the boom 50 affixed thereto to similarly pivot.

The structure of this invention with its moveable delivery system may also be useful in applying a foam or other material to the upper surface of the lagoon (instead of compressed air) which might also have a corrective function in inhibiting the escape of odors from the lagoon.

From the foregoing, it is seen that the device and method of this invention will accomplish at least all of their objectives.

What is claimed is:

1. A method of controlling odor in a waste water lagoon having an upper surface comprising the steps of:

aerating a top horizontal layer of said lagoon adjacent said upper surface by introducing air through a plurality of nozzles submerged in said layer to create a plurality of air bubbles in said layer, and horizontally moving said nozzles progressively through said layer.

2. The method of claim 1 wherein said nozzles are moved in a longitudinal direction through said layer.

3. The method of claim 1 wherein said nozzles are moved in an arcuate direction through said layer.

4. The method of claim 1 wherein said nozzles are divided into groups of nozzles which are separately moved through said layer.

5. The method of claim 1 wherein cantilevered booms are movably mounted at locations around said lagoon with portions of their length extending in an inboard direction with respect to said lagoon with said nozzles mounted thereto.

6. The method of claim 1 wherein said nozzles are mounted at the same horizontal plane while moving through said layer.

7. The method of claim 6 wherein said nozzles are moved vertically to maintain the same vertical depth in said layer to accommodate any changes in the elevation of said upper surface.

8. A device for controlling the odor in waste water lagoons, comprising, a support structure, a boom operatively secured to said support structure and extending outwardly therefrom to operatively contact waste water in an adjacent lagoon, and means on said boom to deliver odor inhibiting material from said boom to an adjacent lagoon with which it is in operative contact;

and power means secured to said boom to cause said boom to move horizontally with respect to an adjacent lagoon while said odor inhibiting material is being delivered.

9. The device of claim 8 wherein said odor inhibiting material is compressed air.

10. The device of claim 9 wherein said boom has a plurality of spaced nozzles to deliver said compressed air to an adjacent lagoon.

11. The device of claim 8 wherein said support structure includes a support platform for attachment to a bank adjacent a waste water lagoon.

12. The device of claim 8 wherein said support structure is located within a waste water lagoon.

13. The device of claim 8 wherein said boom is mounted on said support structure to be in position above an adjacent waste water lagoon.

14. The device of claim 13 wherein said boom has a plurality of spaced nozzles extending downwardly therefrom to be submersed in the water of a waste water lagoon, as a source of compressed air connected to said nozzles.

15. The device of claim 10 wherein said nozzles have air discharge apertures having a diameter of between 1 and 2 mm.

16. The device of claim 14 wherein said source of compressed air delivers compressed air to said nozzles at a pressure of 2–5 psi.

17. The device of claim 8 wherein said support structure includes a vertically adjustable support frame to permit said boom to be horizontally raised or lowered to accommodate different water levels in a waste water lagoon.

18. The device of claim 8 wherein a plurality of buoyant elements are secured to said boom to facilitate the positioning of said boom in a substantially horizontal position above the water level in an adjacent waste water lagoon.

19. The device of claim 17 wherein said support frame is vertically pivotally positioned to raise or lower said boom with respect to the water level in an adjacent lagoon.

20. The device of claim 8 wherein said power means to cause said boom to move horizontally causes said boom to pivot horizontally about a vertical axis extending through said support structure.

21. The device of claim 20 wherein said power means includes a hydraulic cylinders.

22. The device of claim 8 wherein said support structure is located in the center of a substantially circular waste water lagoon structure.

23. The method of claim 1 wherein said aerating step is conducted at a depth of between 12 and 24 inches below said upper surface.

24. The device of claim 10 wherein said boom has a plurality of spaced nozzles to deliver said compressed air to an adjacent lagoon, with the spacing of said nozzles being progressively decreased from said support structure so that the spacing thereof adjacent said support structure is greater than the spacing outwardly therefrom.

* * * * *